Oct. 5, 1954  J. C. GILL  2,690,837
CUP-DUMPING AND WASHING MEANS FOR EGG SEPARATORS
Filed April 18, 1952 2 Sheets-Sheet 1
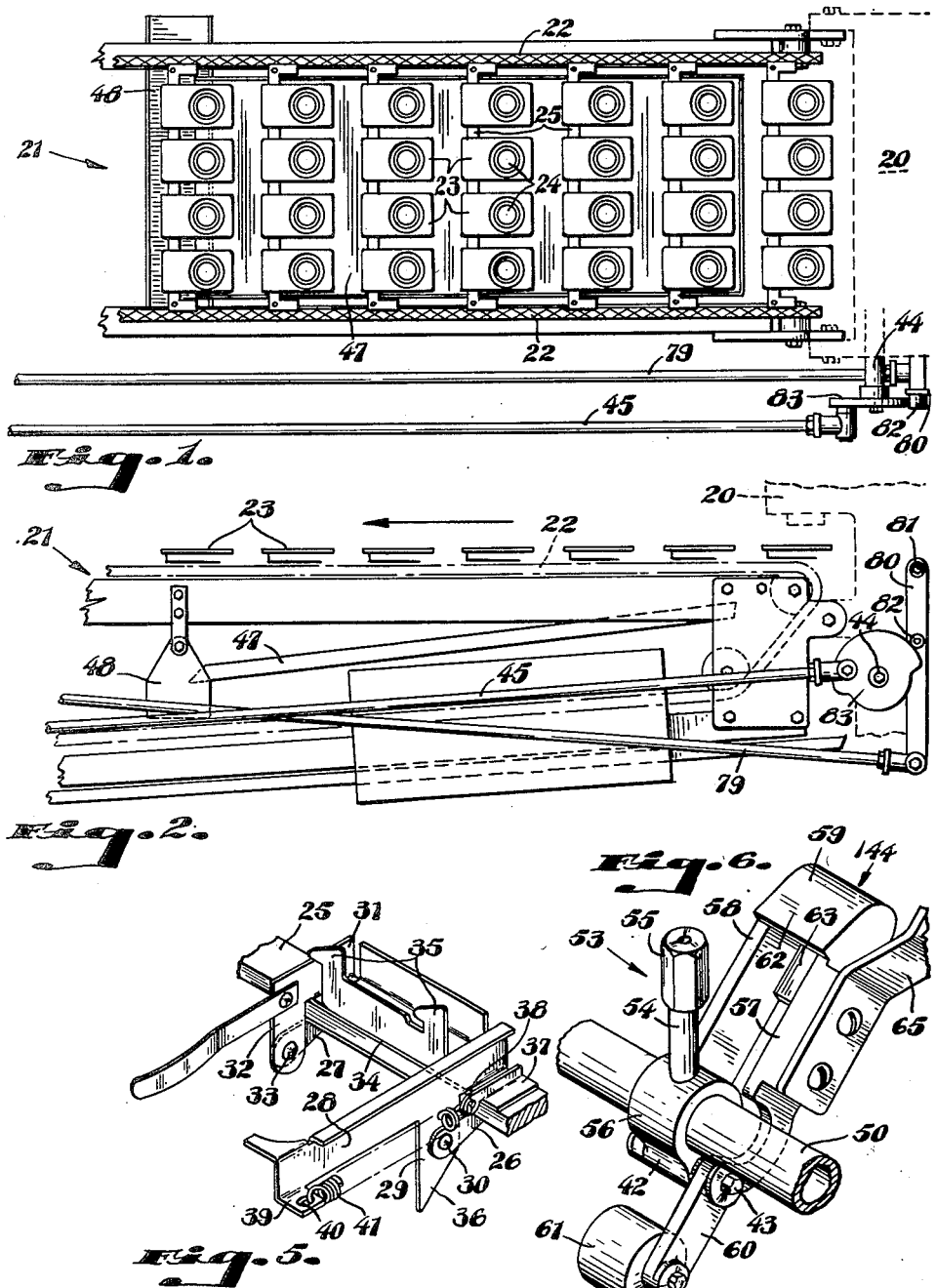
INVENTOR.
JAMES C. GILL,
BY: Harold B Hood.
ATTORNEY.

Oct. 5, 1954  J. C. GILL  2,690,837

CUP-DUMPING AND WASHING MEANS FOR EGG SEPARATORS

Filed April 18, 1952  2 Sheets-Sheet 2

INVENTOR.
JAMES C. GILL,
BY: Harold B. Hood.
ATTORNEY.

Patented Oct. 5, 1954

2,690,837

UNITED STATES PATENT OFFICE 2,690,837

CUP-DUMPING AND WASHING MEANS FOR EGG SEPARATORS

James C. Gill, Indianapolis, Ind.

Application April 18, 1952, Serial No. 282,996

17 Claims. (Cl. 198—229)

In conventional installations for breaking and separating eggs, whole eggs are removed from their shells and dropped into separating trays in which, ideally, all of the white of each egg is separated from all of the yolk of the egg, the yolk remaining, in unbroken condition, in a yolk cup. Under some circumstances, a yoke may be broken before or after deposit of the egg in a separating tray; and when that happens, at least some of the yolk material will almost inevitably find its way into the receptacle, in the tray, intended for egg white only. Even small percentages of yolk material have a deleterious effect upon egg white intended for commercial use; and therefore it is essential that any individual egg white, which is contaminated with any yolk material at all, be held back from deposit in the collector for egg white at the end of the separating machine.

It has been conventional to mount the separating trays upon a conveyor through latch mechanism, and to station an operator adjacent the point at which the eggs are dropped into the separating trays, assigning to that operator the duty of removing from the machine any tray in which the egg white is contaminated with yolk material. Of course, a substitute tray must be replaced on the conveyor before that portion of the conveyor again reaches the point at which eggs are dropped from the breaking machine; and it has been found that this kind of manipulation cannot be successfully and invariably carried out.

In one machine known to me, the separating trays are latch-held in egg-receiving position, but are mounted upon hinges so that the operator need only trip a latch to permit any tray to drop into liquid-discharging position, without removing the tray from the conveyor; and in that machine, means is provided for washing any tray which passes a washing station in liquid-discharging position, and for automatically returning that tray to liquid-retaining position on the conveyor, before the tray reaches the egg-receiving station. In that machine, however, the tray-mounting mechanism and the washing mechanism and the tray-returning mechanism are all rather complicated and consequently subject to mechanical disorder.

It is the primary object of the invention to provide a machine in which the trays are hinge-mounted on the conveyor and are held, by spring toggle mechanism, either in liquid-retaining position or in liquid-discharging position, the arrangement being such that a tray can be shifted to dumping position by merely depressing its trailing end as it moves past the inspecting operator. A further object of the invention is to provide improved mechanism for washing the interior of any separating tray which passes a washing station in liquid-discharging position. A still further object of the invention is to provide improved means for returning any dumped tray to liquid-retaining position before that tray reaches the egg dropping station.

To the accomplishment of the above and related objects, my invention may be embodied in the form illustrated in the accompanying drawings, attention being called to the fact, however, that the drawings are illustrative only, and that change may be had in the specific construction illustrated and described, so long as the scope of the appended claims is not violated.

Fig. 1 is a plan view of the receiving end of an egg separating machine constructed in accordance with my invention;

Fig. 2 is a side elevation of that portion of the machine shown in Fig. 1;

Fig. 5 is an enlarged perspective view of a tray-carrying frame showing the manner in which such frame is secured to the conveyor and the mechanism for retaining the frame in either of its two positions corresponding to the liquid-retaining and liquid-discharging positions of its supported cup or tray;

Fig. 6 is an enlarged perspective view of one of the washer units of the machine shown in active position.

Figure 3:
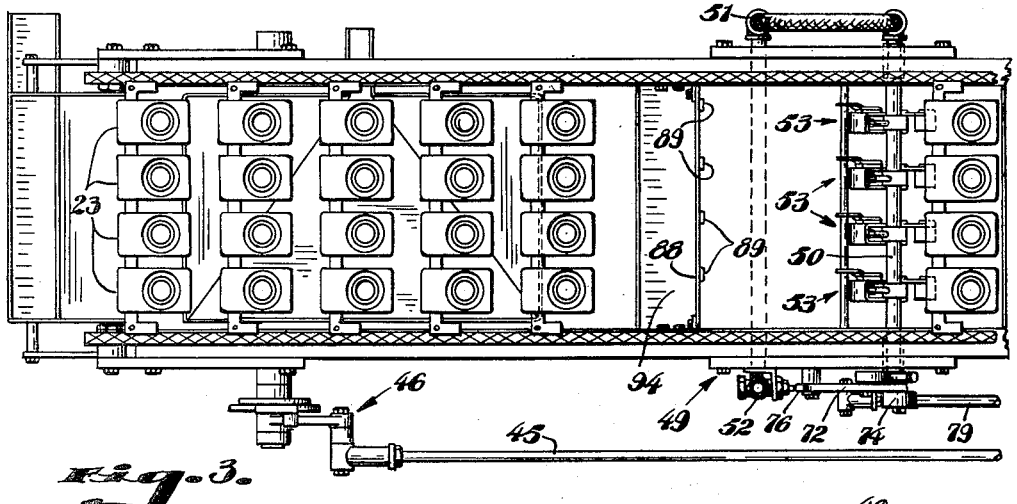
Fig. 3 is a plan view showing the discharge end of such a machine.

Referring more particularly to the drawings, it will be seen that, in Figs. 1 and 2, I have more or less diagrammatically indicated an egg breaking machine 20 of standard construction, with which is associated a separating machine 21. The machine 21 comprises a frame upon which is supported an endless conveyor 22 carrying a multiplicity of trays 23 arranged in ranks extending transversely of the line of movement of the conveyor and in files extending in the line of movement of the conveyor. Each tray is provided with a cup 24 so constructed as to be operable to separate the white from the yolk of an egg deposited in the cup by the machine 20. The cupped trays 23 and the means for actuating the separating devices form no part of the present invention, and therefore are neither described nor illustrated herein in detail.

A multiplicity of bars or brackets 25 will be secured to the conveyor elements 22, suitably spaced longitudinally thereof and, in the illustrated embodiment of the invention, each such bar supports four tray-carrying frames, arranged in a transverse rank. For each such frame, the bar 25 is provided with a pair of ears 26 and 27. Each frame comprises a side element 28 having a downturned ear 29 pivoted at 30 upon an ear 26; a second side element 31 having a downturned ear 32 pivoted at 33 upon an ear 27; and a bridging element 34 joining said elements 28 and 31. At 35, I have indicated conventional means for securing an egg-separating tray to the frame.

The ear 29 projects beyond pivot point 30 and its free end 36 tapers from the edge of ear 29 remote from bracket 25 toward the opposite edge of said ear, for a purpose which will later become apparent.

A lug 37 is fixed on bracket 25 adjacent the element 28 and has an eye 38 therein. A tab 39 is turned out of the plane of element 28, on the end remote from bracket 25, and has an eye 40 therein. A coiled spring 41 has one end hooked in eye 38 and has the other end hooked in eye 40.

Figure 7:
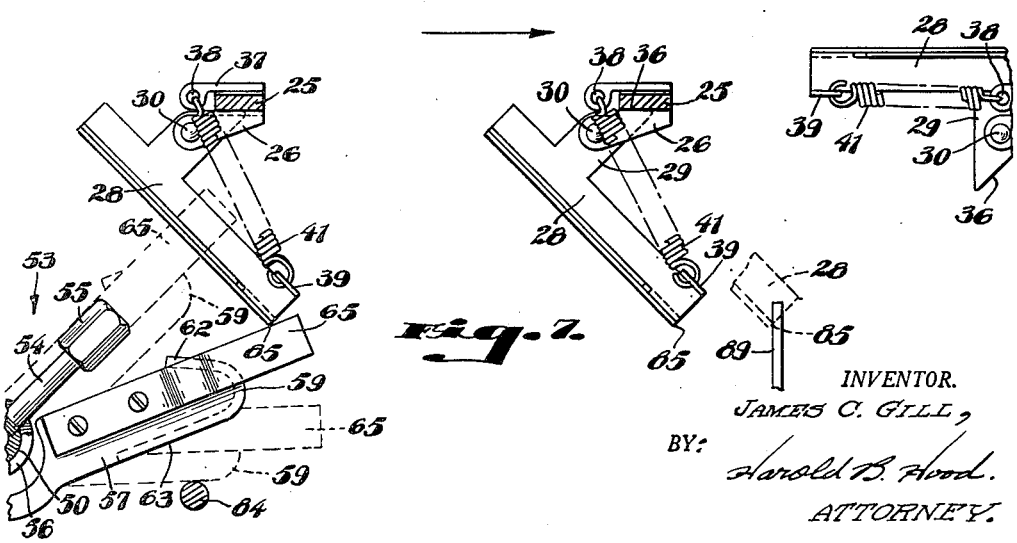
Fig. 7 is a more or less diagrammatic view, showing one cup of three successive ranks of cups, and illustrating the manner in which the cups coact with the washing units and the means whereby inverted cups are returned to liquid-retaining positions.

From an inspection of Fig. 7, it will be seen that when the frame is in a position corresponding to the liquid-retaining position of its tray, the axis of spring 41 lies between the plane of the tray and the pivot point 30. When the frame is in a position corresponding to the liquid-discharging position of its tray, the axis of pivot point 30 lies between the plane of the tray and the axis of spring 41. Such a positioning of the parts, of course, comprises a toggle arrangement and, in moving the tray from one of its positions to the other, the axis of spring 41 passes through the axis of the pivot point and the spring 41 then snaps the tray to its alternate position. The tray is then held in that position by spring 41 until it is again moved an amount sufficient to cause the axis of spring 41 to pass through the axis of the pivot point 30 when it will again be snapped to its other position under the influence of spring 41.

The purpose of the extended portion 29 will also become apparent from an inspection of Fig. 7. The end 36 engages the bar 25 to act as a stop for the tray-supporting frame when the tray is moved to its liquid-discharging position.

Whenever an operator, stationed in the region illustrated in Figs. 1 and 2 notes an egg whose yolk has been broken in one of the cups 24, the operator will simply depress the trailing end of the corresponding tray until the axis of the spring 41 passes through the axis of the pivot point 30 and the tray will then be snapped to its ultimate position under the influence of the toggle action of spring 41, with the end 36 of ear 29 abutting the under side of bracket 25. The egg contained therein will thus be discharged into chute 47 and thence to a transverse chute 48 which leads to a collecting container for such eggs. Eggs collected from these chutes find a ready market, after freezing, as whole eggs.

A main drive shaft is indicated at 44, and a pitman 45, driven from said shaft, connects with a step-by-step drive mechanism indicated generally by the reference numeral 46, such mechanism being connected to drive the conveyor 22.

Immediately in advance of the separating station, I provide a cup washing station, indicated generally by the reference numeral 49. At such station, there is located a header 50 mounted for oscillation about transversely of the machine about its own axis, and supplied, by suitable conduit means 51, controlled by valve means 52, with washing liquids from any suitable source.

Supported upon, and communicating with the header 50, I provide, in the illustrated embodiment of my invention, four washing nozzle assemblies, indicated by the reference numeral 53, one arranged in registry with each file of trays 23. Since the four nozzle assemblies are identical, only one has been illustrated in detail, and only one will be described.

As is clearly shown in Fig. 6, each such assembly comprises a tube 54 projecting substantially radially from the header 50, communicating therewith and carried thereby. At its outer end, the tube 54 carries a spray unit or nozzle 55. A cylindrical sleeve 56 is sleeved on header 50 and the tube 54 passes through a radial opening in said sleeve and so into threaded engagement in a port (not shown) in header 50. At a point substantially opposite from said radial opening, sleeve 56 is provided with a radial lug 42. A mask or shield 144, having side plates 57 and 58 straddling lug 42 and pivoted thereon by means of screws 43, or the like, comprises a hood portion 59 bridging said side plates, a leg 60, constituting an extension of side plate 57 beyond the pivot means 43, and a counterweight 61 supported on the free end of leg 60 normally yieldably retaining the hood portion 59 in masking relation with nozzles 55, as shown by dotted lines in Fig. 7. A lever 65 is fixed to side plate 57 and extends beyond the hood portion 59.

One side 62 of the hood portion 59 is terminated, in its approach toward header 50, at such a point that it clears the nozzle 55 as the mask is swung about pivot means 43. The opposite side 63 of the hood portion is considerably longer than side 62 so that it will encounter nozzle 55, as it swings about pivot means 43. Thus, as header 50 is turned about its axis in a clockwise direction as viewed in Fig. 6, nozzle 55 will encounter side 63 of hood portion 59 and carry the masking means 144 along with it. As the header 50 is rotated counter-clockwise, toward a vertical position, the masking means tends to travel therewith under the influence of the counterweight 61.

A lever 68 (Fig. 4) is fixed to the header 50, and is formed at its outer end with a cam groove 69. A bell crank 70 is pivoted about an axis 71, substantially parallel with said header, and one arm 72 thereof carries a cam follower 73 cooperatively engaging with cam groove 69. Beyond the cam follower 73, arm 72 carries a counterweight 74 urging the clockwise swinging of crank 70 about axis 71. The other arm 75 of lever 70 is connected, at its free end, with a link 79. Near its pivot point, crank 70 carries a finger 76 engageable with an actuating stem 77 in valve 52.

Link 79 connects the arm 75 with a lever 80 (Fig. 2) pivotally mounted at 81 and carrying a roller 82 operatively engaging a cam 83 mounted to drive shaft 44. Obviously, as the cam 83 rotates, the lever 80 will be oscillated to oscillate the crank 70, the roller 82 being yieldably held in cooperative engagement with cam 83 by the counterweight 74. As crank 70 moves in a counter-clockwise direction, to the position of Fig. 4, follower 73, coacting with groove 69 will turn header 50 clockwise about its axis, as viewed in Fig. 4 (counterclockwise as viewed in Figs. 6 and 7), to direct the spray nozzles 55 toward the paths of the trays 23. The cam groove 69 is so proportioned that header 50 is swung about its axis during initial movement of crank 70 and thereafter, movement of crank 70 results in no further movement of header 50. As the crank approaches the end of its stroke, finger 76 actuates the stem 77 to open valve 52.

Now, as the crank 70 is swung in a clockwise direction, finger 76 first releases stem 77 closing valve 52, and follower 73 then moves along groove 69 to swing header 50 to move spray assemblies 53 away from the paths of the trays 23.

The parts are so synchronized that the conveyor 22 will be advanced, after the spray assemblies have been so shifted, to bring a new rank of trays 23 into registry with the washing station.

Figure 4:
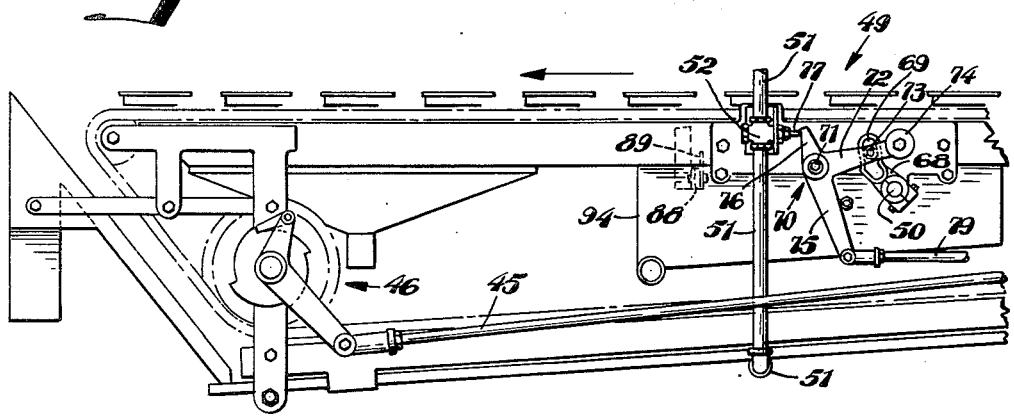
Fig. 4 is a side elevation of that portion of the machine shown in Fig. 3.

If all of the trays of the rank concurrently located at the washing station are in liquid-retaining position, all of the masks will remain in relative positions with nozzles 55 as shown in dotted lines in Fig. 7, so that, although washing liquid will be supplied to, and will flow through, all the nozzles 55, none of the liquid will be delivered against any tray, but all of it will be deflected by the masks 144 into a suitable drain trough 94 (Fig. 4). If, however, one or more of the trays of the rank currently in registry with the washing station are currently in the position illustrated at the left end of Fig. 7, the lever 65 of that washing assembly concurrently registering with such tray will, as the washing assembly rises, strike the trailing edge 85 of that tray, and movement of lever 65 under the influence of the counterweight 61, will be arrested as the tube 54 continues to swing in a counter-clockwise direction as viewed in Figs. 6 and 7. Thereby, the mask 144 associated with that particular nozzle will be stopped at the solid-line position of Fig. 7; and, when the valve stem 77 is depressed to supply washing liquid to the spray assemblies, liquid will be discharged through that nozzle against the interior surface of the associated cup 24 to clear the same of adhering material.

It is particularly to be noted that such withdrawal of the mask occurs before the finger 76 engages the valve stem 77 to open valve 52. Correspondingly, initial clockwise movement of the crank 70 permits closure of valve means 52 (the stem 77 being spring urged to closed position) before the cam follower 73 coacts with groove 69 to begin retractive swinging movement of header 50 which will result in returning the nozzle 55 to the interior of its mask 144.

In order to insure the return of hood portion 59 to masking relation with its nozzle, I prefer to provide a rod 84 (Fig. 7) disposed in the path of each mask 144 so that, should the counterweight be insufficient, for any reason, to return the mask to that position, the mask will encounter the rod 84 and be arrested in its movement to allow the nozzle 55 to move behind hood portion 59.

After such retractive movement of the header 50 has been completed, the mechanism 46 will again move conveyor 22 forward. A supporting element 88 has fixed thereto a plurality of upstanding abutment members 89, one for each file of trays. Movement forward of conveyor 22 will cause the edge 85 of any inverted tray to engage one of the members 89 and further movement of conveyor 22 will tend to swing the tray about its hinge means moving the axis of spring 41 through the axis of pivot 30. The moment this happens, spring 41 will immediately snap the tray back to its liquid-retaining position, and spring 41 will then hold the tray in liquid-retaining position until the operator again depresses the tray to cause the axis of spring 41 to pass through the axis of pivot 30.

I claim as my invention:

1. In a machine of the class described, an endless conveyor, means for driving said conveyor, a plurality of cupped trays supported on said conveyor for movement therewith, hinge means for each tray located upon an axis transverse to the line of movement of said conveyor, fixed relative to said conveyor, and supporting its tray for oscillation about said axis between a liquid-retaining position and a liquid-discharging position, and means for holding each tray relatively in either of said positions comprising a coiled spring having one end anchored to said tray at a point remote from said hinge means, and the other end anchored to said conveyor at a point such that when said tray is in its liquid-retaining position the axis of said spring lies between said hinge axis and the plane of said tray, and when said tray is in its liquid-discharging position the axis of said hinge means lies between said spring axis and the plane of said tray, said spring axis traversing said hinge axis as said tray is moved from one of said positions to the other of said positions.

2. The machine of claim 1 including an abutment member fixed in the path of movement of the edge, remote from said hinge means, of said trays when said trays are in their liquid-discharging position, said abutment member being struck by each such tray edge as each tray is moved forward by said conveyor to cause said tray to swing about its hinge means, moving the axis of said coiled spring through the axis of said hinge means, said spring then shifting said tray to its said liquid-retaining position.

3. The machine of claim 1 including means for washing the cup portion of any one of the trays which reaches a predetermined position in conveyor travel while in its liquid-discharging position comprising a header mounted for oscillation about its own axis on a line transverse to the line of conveyor travel, a spray nozzle connected with and supplied by said header, means for turning said header about its axis to move said nozzle into and out of the path of movement of said trays, a mask for said nozzle oscillably supported from said header for movement out of and into masking relation with said nozzle, a portion of said mask being engageable with any one of said trays reaching said predetermined position while in its liquid-discharging position to block movement of said mask as said header is turned about its axis, to allow said nozzle to move from behind said mask into coactive registry with the cup portion of said tray, and valve means for controlling liquid flow to said header and so to said nozzle.

4. The machine of claim 3 including means for actuating said valve means to permit liquid flow only after said nozzle is moved into the path of said trays, and to stop liquid flow before said nozzle is moved out of the path of said trays.

5. The machine of claim 3 including an abutment disposed in the path of movement of said mask about said header and engageable by said mask as the mask is moved, under the influence of said header turning about its axis to move said nozzle out of the path of said trays, to arrest the said movement of said mask to allow said nozzle to return to a position behind said mask.

6. The machine of claim 3 in which the center of gravity of said mask is located on the side of said header opposite from that portion of the mask registering with said nozzle, to cause said mask to remain in masking relation with said nozzle when no tray is in liquid-discharging position when reaching said predetermined position.

7. In a machine of the class described, an endless conveyor, means for driving said conveyor, a plurality of cupped trays supported on said conveyor and arranged thereon in a plurality of ranks, each rank of trays extending transversely of the line of movement of said conveyor and being spaced from each adjacent rank in the direction of such line, and the trays further being arranged in a plurality of files extending in the direction of such line, hinge means for each tray located upon an axis transverse to the line of movement of said conveyor, fixed relative to said conveyor, and supporting its tray for independent oscillation about said axis between a liquid-retaining position and a liquid-discharging position, and means for holding each tray relatively in either of said positions comprising a coiled spring having one end anchored to said tray at a point remote from said hinge means, and the other end anchored to said conveyor at a point such that when said tray is in its liquid retaining position the axis of said spring lies between said hinge axis and the plane of said tray, and when said tray is in its liquid-discharging position the axis of said hinge means lies between said spring axis and the plane of said tray, said spring axis traversing said hinge axis as said tray is moved from one of said positions to the other of said positions.

8. The machine of claim 7 including a plurality of abutment members, one for each file of said trays, each arranged stationarily in the path of movement of the edge, remote from the hinge means, of the trays of each file when said trays are in their liquid-discharging positions, said abutment member being struck by each such tray edge as each tray is moved forward by said conveyor to cause said tray to swing about its hinge means moving the axis of said coiled spring through the axis of said hinge means, said spring then shifting said tray to its said liquid-retaining position.

9. The machine of claim 7 including means for washing the cup portions of any one of the trays which reach a predetermined position while in its liquid-discharging position comprising a header mounted for oscillation about its own axis on a line transverse to the line of conveyor travel, a plurality of tubes communicating with said header, supported thereon, and projecting therefrom in a common direction and in substantially parallel relation, there being one of said tubes for each file of said trays, a spray nozzle carried at the free end of each tube, means for turning said header about its axis to move said nozzles into and out of the path of said trays, a mask for each nozzle oscillably supported from said header for movement out of and into masking relation with its associated nozzle, a portion of each of said masks being engageable with any one of the trays in its associated file reaching said predetermined position while in its liquid-discharging positon to block movement of the mask, as said header is turned about its axis, to allow the associated nozzle to move from behind its mask into coactive registry with the cup portion of its associated tray, and valve means for controlling liquid flow to said header and so to said nozzles.

10. The machine of claim 9 including means for actuating said valve means to permit liquid flow only after said nozzles are moved into the path of said trays and to stop liquid flow before said nozzles are moved out of the path of said trays.

11. The machine of claim 9 including a rod fixed relative to said header in a line substantially parallel to said header and engageable by said masks as said masks are turned, under the influence of said header as it turns about its axis to move said nozzles out of the path of said trays, to arrest the turning movement of said masks to allow said nozzles to return to a position behind said masks.

12. The machine of claim 9 in which the center of gravity of said nozzles are all similarly located on the side of said header opposite from that portion of each mask registering with its respective nozzle, to cause said masks to remain in masking relation with their respective nozzles when no tray is in liquid-discharging position upon reaching said predetermined position.

13. In a machine of the class described, a header, means for turning said header about its own axis, a plurality of tubes communicating with said header, supported thereon, and projecting therefrom in a common direction and in substantially parallel relation, a spray nozzle carried at the free end of each tube, masking means for each nozzle comprising a hood portion supported from said header for turning movement substantially about the axis of said header and adapted to enshroud said nozzle, said hood portion having an opening in one side thereof to permit passage of said nozzle into and out of said hood portion, a counterweight supported from said masking means and arranged on the side of said header opposite said hood portion to cause said hood portion, when movement thereof is unrestricted, to move into, and remain in, masking relation with said nozzle, and a finger carried by said masking means engageable with an element, upon turning of said header about its axis, to block movement of said hood portion and so allow said nozzle to move from behind said hood portion through said opening, and valve means controlling fluid flow to said header and so to said nozzle to start fluid flow after said nozzles move out of said hood portions and stop fluid flow before said nozzles move back into said hood portions.

14. The machine of claim 13 in which the means for turning said header about its axis comprises an arm fixed to said header and having a cam groove therein spaced from said header, a bell-crank lever fixed for oscillation about an axis substantially parallel with said header but spaced therefrom and carrying a cam follower on one leg at a point remote from its axis, said follower operatively cooperating with one portion of said cam groove to transmit turning motion of said bellcrank lever to said arm and so to said header and with another portion of said cam groove in which no motion will be transmitted to said header, an actuating rod being fixed to the other leg of said bellcrank lever for driving the same, said bellcrank lever further having a finger engageable with said valve means to actuate the same during movement of said follower in said other portion of said cam groove to start fluid flow after said nozzles move out of said hood portions and stop fluid flow before said nozzles move back into said hood portions.

15. In a machine of the class described, a conveyor having an upper run and a lower run, means for driving said conveyor, a plurality of egg-separator trays arranged on said conveyor in a plurality of ranks, each rank of trays extending transversely of the line of movement of said conveyor and being spaced from each adjacent rank in the direction of said line, and the trays further being arranged in a plurality of files extending in the direction of such line, hinge means for each tray located on an axis transverse to the line of movement of said conveyor and supporting its tray, when on said upper conveyor run, for independent movement about said axis between a liquid-retaining position and a liquid-discharging position, and a toggle spring having one end anchored on said conveyor at a point above and ahead of said hinge axis and its other end anchored on said tray at a point behind said hinge axis, said last-named point being above said hinge axis when said tray is in liquid-retaining position and below said hinge axis when said tray is in liquid-discharging position.

16. The machine of claim 15 including abutment means located between said runs in the path of any tray disposed in liquid-discharging position and effective to arrest the depending portion of such tray, during transit of such tray with said conveyor, to shift a line joining said points past said hinge axis.

17. The machine of claim 15 including a header transversely arranged between said conveyor runs, a spray nozzle for each file of said trays supported on and communicating with said header, masking means for each nozzle movable into and out of masking relation to its nozzle, each tray, when in liquid-discharging position, having a portion coactive with the masking means for the corresponding nozzle as said tray moves past said header, to shift said masking means out of masking relation with its nozzle, and means for discharging liquid under pressure through said header from all of said nozzles each time a rank of trays passes said header.

References Cited in the file of this patent

UNITED STATES PATENTS

| Number | Name | Date |
|---|---|---|
| 214,169 | Merrill | Apr. 8, 1879 |
| 1,465,387 | Bowers | Aug. 21, 1923 |
| 1,710,473 | Cothay | Apr. 23, 1929 |
| 1,720,789 | Heusser | July 16, 1929 |
| 2,090,963 | Reese | Aug. 24, 1937 |
| 2,263,627 | Herold | Nov. 25, 1941 |
| 2,284,003 | Luppert | May 26, 1942 |
| 2,479,437 | Vig Mostad et al. | Aug. 16, 1949 |
| 2,516,499 | Albright | July 25, 1950 |
| 2,521,907 | Gill | Sept. 12, 1950 |
| 2,522,310 | Smith | Sept. 12, 1950 |